US010405129B2

(12) United States Patent
Topalli (10) Patent No.: US 10,405,129 B2
(45) Date of Patent: Sep. 3, 2019

(54) APPARATUS, METHOD AND COMPUTER PROGRAM TO CONTROL NOTIFICATION BASED ON DISTANCE

(71) Applicants: Sony Corporation, Tokyo (JP); Sony Europe Limited, Weybridge (GB)

(72) Inventor: Ihsan Topalli, Basingstoke (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 33 days.

(21) Appl. No.: 15/403,547

(22) Filed: Jan. 11, 2017

(65) Prior Publication Data

US 2017/0265028 A1    Sep. 14, 2017

(30) Foreign Application Priority Data

Mar. 11, 2016    (GB) .................................. 1604215.2

(51) Int. Cl.
*H04W 4/02*    (2018.01)
*H04W 4/50*    (2018.01)
(Continued)

(52) U.S. Cl.
CPC .............. *H04W 4/02* (2013.01); *H04M 1/605* (2013.01); *H04M 1/7253* (2013.01); *H04M 1/72519* (2013.01); *H04M 1/72563* (2013.01); *H04M 1/72572* (2013.01); *H04M 19/042* (2013.01); *H04W 4/023* (2013.01); *H04W 4/12* (2013.01);
(Continued)

(58) Field of Classification Search
CPC ......... H04W 4/02; H04W 4/12; H04W 4/023; H04W 4/50; H04W 4/16; H04W 4/80; H04M 1/72563; H04M 1/605; H04M 2203/2094; H04M 1/72519; H04M 1/72572; H04M 1/7253; H04M 19/042; H04M 2250/12; H04M 2250/22; H04M 2250/52; H04M 2250/10
See application file for complete search history.

(56) References Cited

U.S. PATENT DOCUMENTS 7,469,155 B2 *  12/2008  Chu ................... H04M 1/72569
                                                        455/456.1
8,452,020 B2     5/2013   Gregg et al.
(Continued)

FOREIGN PATENT DOCUMENTS

CN      102447787 A     5/2012
CN      103 401 991 A   11/2013
(Continued)

OTHER PUBLICATIONS

Office Action dated Apr. 18, 2018 in European Patent Application No. 17 153 364.9.

*Primary Examiner* — Marcos L Torres
(74) *Attorney, Agent, or Firm* — Oblon, McClelland, Maier & Neustadt, L.L.P.

(57) ABSTRACT

An information processing apparatus comprising: transceiver circuitry configured to receive a notification for a user; sensing circuitry configured to determine the position of the information processing apparatus; storage configured to store a notification mechanism in association with particular positions of the information processing apparatus; and control circuitry configured to control notification circuitry to perform the notification mechanism based on the position of the information processing apparatus.

13 Claims, 10 Drawing Sheets

(51) Int. Cl.
*H04M 1/725* (2006.01)
*H04M 19/04* (2006.01)
*H04W 4/16* (2009.01)
*H04M 1/60* (2006.01)
*H04W 4/12* (2009.01)
*H04W 4/80* (2018.01)

(52) U.S. Cl.
CPC .............. *H04W 4/16* (2013.01); *H04W 4/50* (2018.02); *H04M 2203/2094* (2013.01); *H04M 2250/10* (2013.01); *H04M 2250/12* (2013.01); *H04M 2250/22* (2013.01); *H04M 2250/52* (2013.01); *H04W 4/80* (2018.02)

(56) References Cited

U.S. PATENT DOCUMENTS

| | | |
|---|---|---|
| 2004/0214594 A1 | 10/2004 | Holman, IV |
| 2007/0129113 A1 | 6/2007 | Klicpera et al. |
| 2009/0186633 A1 | 7/2009 | Yonker et al. |
| 2010/0009721 A1 | 1/2010 | Chien et al. |
| 2014/0221050 A1* | 8/2014 | Kato ................... G06F 1/1626 455/566 |
| 2015/0229782 A1* | 8/2015 | Zuidema ............... H04W 4/008 455/418 |
| 2017/0063738 A1* | 3/2017 | Ozeki ..................... H04L 51/04 |

FOREIGN PATENT DOCUMENTS

| | | |
|---|---|---|
| CN | 103491230 A | 1/2014 |
| CN | 105072242 A | 11/2015 |
| EP | 1 162 853 A1 | 12/2001 |
| EP | 1 298 954 A1 | 4/2003 |
| GB | 2 360 419 A | 9/2001 |
| GB | 2486164 A | 6/2012 |
| GB | 2527206 A | 12/2015 |
| JP | 2011-35726 | 2/2011 |
| JP | 2011-135551 | 7/2011 |

\* cited by examiner

FIG. 7

APPARATUS, METHOD AND COMPUTER PROGRAM TO CONTROL NOTIFICATION BASED ON DISTANCE

CROSS REFERENCE TO RELATED APPLICATIONS

The present application claims priority to United Kingdom Application 1604215.2 filed on 11 Mar. 2016, contents of which being incorporated herein by reference in its entirety.

BACKGROUND

The present disclosure relates generally, but not exclusively, to an apparatus, method and computer program.

BACKGROUND TO THE DISCLOSURE

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

With the number of smartphones and other telephonic devices increasing, most consumers now carry a smartphone device. Often, users communicate using their smartphone rather than the traditional landline. This means that users are likely to receive calls and text messages at any time. Sometimes, it is not convenient to have a particular notification at a particular volume. One example of this is when a user is in the office and they leave their smartphone on a table. The notification can cause disruption to other people in the environment and ultimately embarrassment for the user of a smartphone.

It is at least an aim of this disclosure to alleviate this problem.

SUMMARY

In an embodiment of the present disclosure, there is provided an information processing apparatus comprising: transceiver circuitry configured to receive a notification for a user; sensing circuitry configured to determine the position of the information processing apparatus; storage configured to store a notification mechanism in association with particular positions of the information processing apparatus; and control circuitry configured to control notification circuitry to perform the notification mechanism based on the position of the information processing apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Embodiments of the present disclosure will now be described by way of example only and with reference to the accompanying drawings, in which:

FIGS. 4-1 to 4-4 show a graphical user interface for the information processing apparatus of FIG. 3;

DESCRIPTION OF THE EMBODIMENTS

Figure 1:
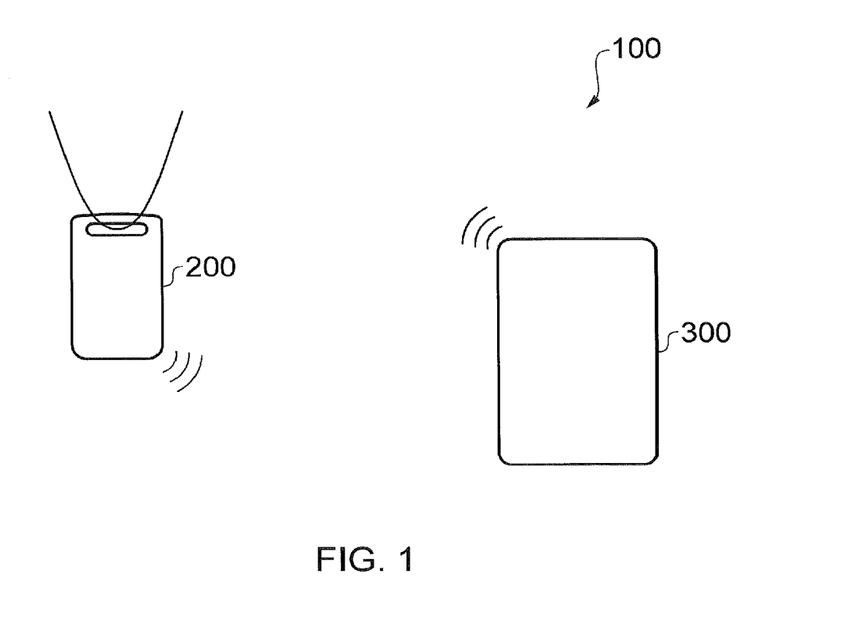
FIG. 1 shows a system according to embodiments of the disclosure.

Referring to FIG. 1 a system 100 according to the disclosure is shown. The system includes an information processing apparatus 300 and a second device 200. In embodiments of the disclosure, the information processing apparatus 300 wirelessly communicates with the second device 200 using a wireless communication protocol such as Wi-Fi or Bluetooth.

The information processing apparatus 300 is, in embodiments, a cellular telephone such as a smartphone or another telephonic device. However, the disclosure is not so limited and the information processing apparatus may be a tablet, laptop computer or other apparatus that is capable of communicating with a second device by either directly or via a network. The second device, in embodiments, is a piece of wearable technology. An example of such wearable technology is a pendant which can communicate with other devices. The second device 200 may be an Internet of Things compliant device and may communicate using Wi-Fi or Bluetooth or another wireless standard. The second device 200 may be a smartwatch or an earpiece such as the Sony® Xperia Ear®. Of course, the second device may not be wearable piece of technology and may be a device located around the home such as an Xperia Eye or the Xperia Projector or the Xperia Agent. The purpose of the second device 200 is to be closer to the user than the information processing apparatus 300.

Figure 2:
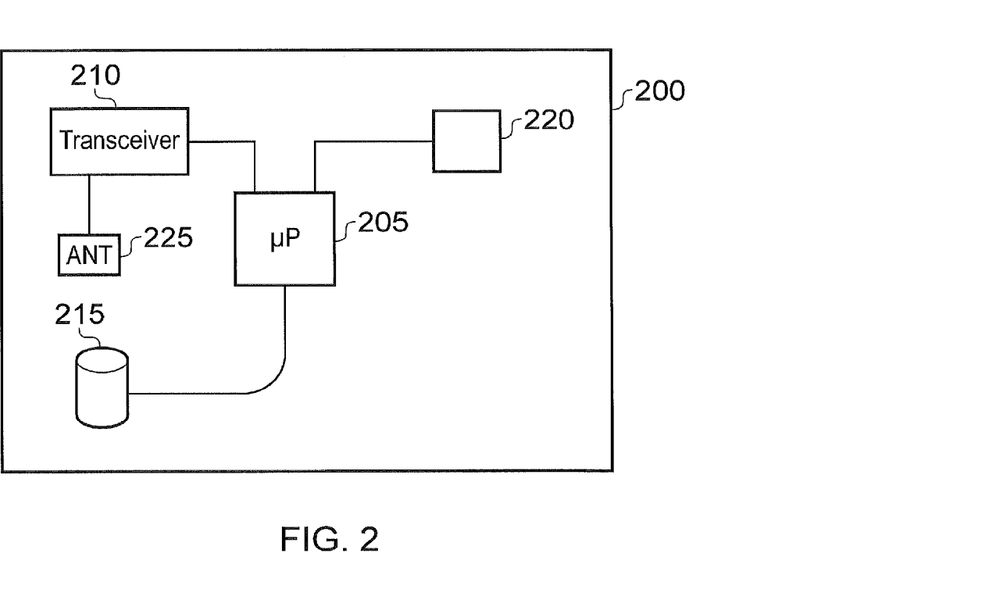
FIG. 2 shows a device according to embodiments of the disclosure.

Referring to FIG. 2, a block diagram showing the second device 200 according to embodiments of the disclosure is shown. The second device 200 is controlled by device control circuitry 205. Device control circuitry 205 may be a micro-processor which is controlled using software code. The software code may be stored in storage 215. Alternatively, of course, the device control circuitry 205 may be an Application Specific Integrated Circuit (ASIC) or a Field Programmable Gate Array (FGPA) or any hard wired control circuitry. Connected to the device control circuitry 205 is device transceiver circuitry 210. Device transceiver circuitry 210 is a transmitter and receiver combination, in embodiments. Of course, the device transceiver circuitry 210 may be a separate transmitter and receiver or indeed just a transmitter or a receiver. The purpose of the device transceiver circuitry 210 is to wirelessly communicate with the information processing apparatus 300. To communicate wirelessly with the information processing apparatus 300 the device transceiver circuitry 210 is connected to device antenna 225.

Additionally connected to the device control circuitry 205, is device interface 220. Device interface 220 provides an interface using which the user can interact and control the second device 200. The device interface 220 may be a touchscreen or may be circuitry that connects to an external device such as a keyboard or mouse. Alternatively, the device interface 220 may be one or more buttons configured to perform certain functions when operated in a particular way.

Figure 3:
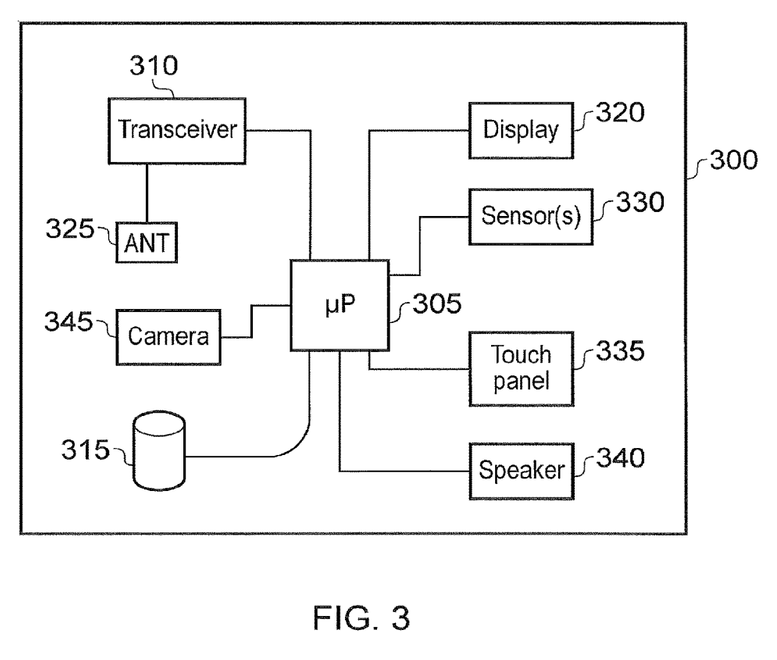
FIG. 3 shows an information processing apparatus according to embodiments of the disclosure.

Referring to FIG. 3, an information processing apparatus 300 according to embodiments of the disclosure is shown. One example of the information processing apparatus 300, as noted above, is a smartphone or tablet type device. An example of a smartphone is an Xperia X or Xperia Z type device and an example of the tablet is an Xperia Z4 tablet. Of course, other types of information processing apparatuses are envisaged such as laptops or other portable devices. Of course, it is envisaged that the device could be any device with a network connection (either wired or wireless) such as a television.

The information processing apparatus 300 is controlled by information processing apparatus control circuitry 305. The information processing apparatus control circuitry 305 may be a microprocessor type device which is controlled using software. Alternatively, the information processing apparatus control circuitry 305 may be an Application Specific Integrated Circuit (ASIC) or a Field Programmable Gate Array (FGPA) or another hardware control device. In embodiments, the information processing apparatus control circuitry is controlled by computer program code stored within information processing apparatus storage 315. User preferences defined during set-up may also be stored within storage 315.

Information processing apparatus transceiver circuitry 310 is connected to the information processing apparatus control circuitry 305. The information processing apparatus transceiver circuitry 310 may be a combined transmitter or receiver or may be a separate transmitter and receiver and may even be an alternative transmitter or receiver combination. The purpose of the information processing apparatus transceiver circuitry 310 is to communicate with a wireless network and the second device 200. This may be achieved using numerous standards such as Wi-Fi and Bluetooth to communicate with the second device 200 and a telecommunication standard such as LTE or 3G, or even WiFi, in order to communicate with a wireless telecommunication network. The information processing apparatus transceiver circuitry 310 is connected to information processing apparatus antenna 325. The purpose of the information processing apparatus antenna 325 is to communicate wirelessly with these other noted devices.

Additionally, the information processing apparatus control circuitry 305 may be connected to an information processing apparatus display 320. The purpose of the information processing apparatus display 320 is to provide information to the user of the information processing apparatus 300. Additionally connected to the information processing apparatus control circuitry 305 is a touch panel 335. The touch panel 335 may be integrated into the display 320 as is known or may be a separate layer either laid over or laid under the display 320. The purpose of the touch panel 335 is to allow the user to control the functions within the information processing apparatus 300 using their finger or another object. Of course, although a touch panel 335 is described as providing an input for the information processing apparatus 300, the disclosure is not so limited and the user may control the functionality of the information processing apparatus 300 using a mouse, keyboard or even gesture recognition or the like.

Additionally connected to the information processing apparatus control circuitry 305 is one or more information processing apparatus sensor circuitry 330. The sensor circuitry 330 may include, and not be limited to, a gyroscope and an accelerometer, Global Positioning System (GPS) circuitry, an image receiving system to receive a captured image or any kind of sensor that allows the information processing apparatus 300 to determine its orientation or position. The position may be determined relative to another object such as the user or may be an absolute position such as the geographical position on the planet.

Additionally connected to the information processing apparatus control circuitry 305, is one or more speaker 340. The speaker volume may be controlled by the information processing apparatus control circuitry 305. As would be appreciated, the speaker 340 provides an audible output to the user. On occasion, the speaker volume 340 may be reduced to zero and in this case, the speaker will be muted. The speaker 340 is one example of a notification device. Of course, the camera flashlight may be used as a notification mechanism (the flashlight may flash depending on the notification being communicated). Other mechanisms are envisaged such as one or more notification Light Emitting Diodes (LEDs) or the like.

Finally, one or more camera elements 345 are connected the information processing apparatus control circuitry 305. The one or more camera elements 345 may be located on the front casing or the rear casing of the information processing apparatus 300. Additional cameras may be provided anywhere within the information processing apparatus 300 or may be even external to the device by provisioning an exterior device to act as a camera such as the Sony Xperia Eye product. Although shown connected to the control circuitry 305, the disclosure is not so limited and the camera element(s) may communicate or be connected to the sensor circuitry.

In operation, the information processing apparatus 300 will communicate with, in embodiments, a wireless network. Of course, the disclosure is not so limited and the information processing apparatus 300 may communicate using a wired or optical network. The wireless network may be a home or business network, the internet or a wireless cellular network. Indeed, the information processing apparatus 300 may also act as an intermediary device which allows the second device 200 to communicate with the wireless network. In other words, the information processing apparatus transceiver circuitry 310 may receive voice, or any kind of data from the second device 200 and the information processing apparatus transceiver circuitry 310 may be controlled to forward this data to the wireless network. This allows the second device to be connected to the wireless network via the information processing apparatus 300.

Figure 41:
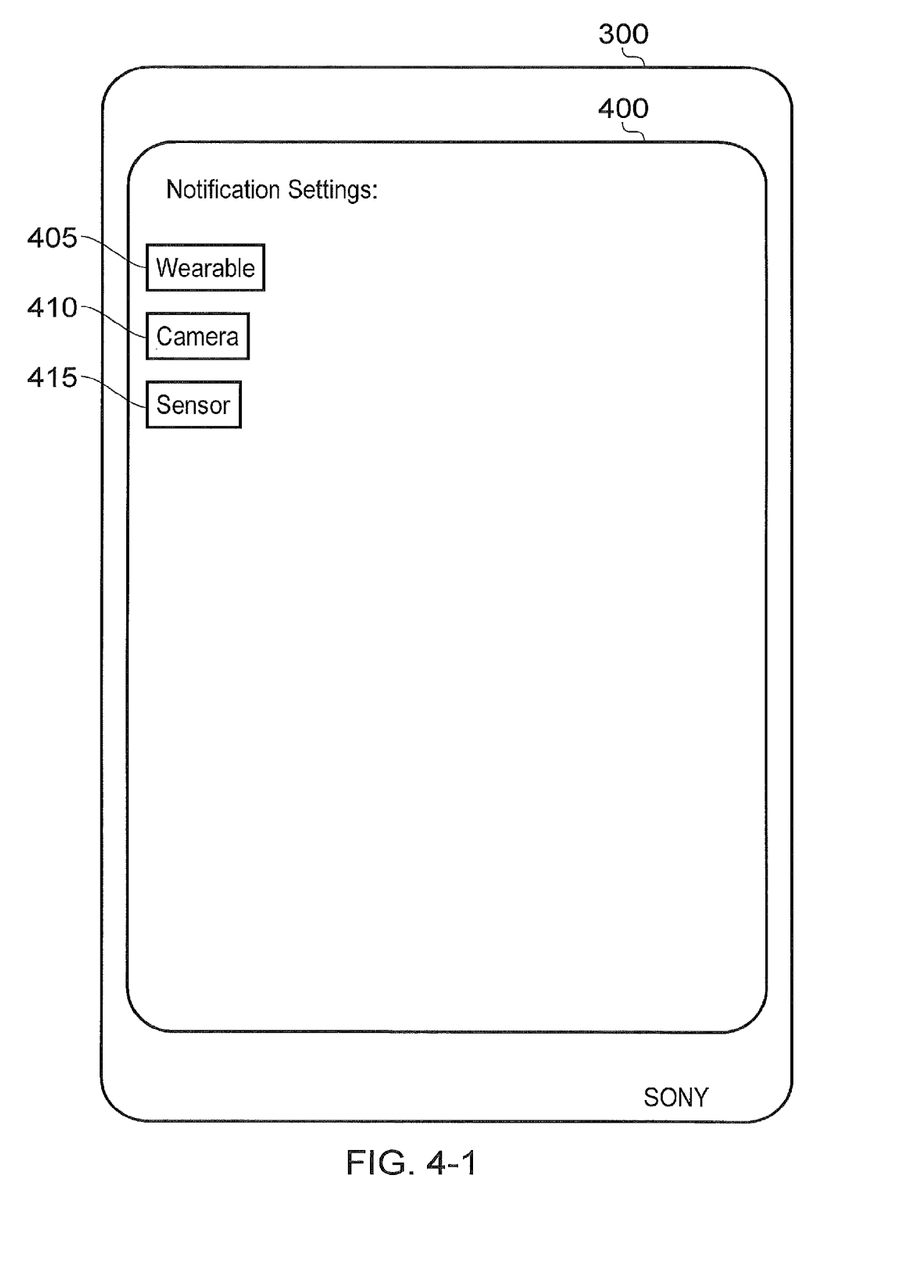
Figure 44:
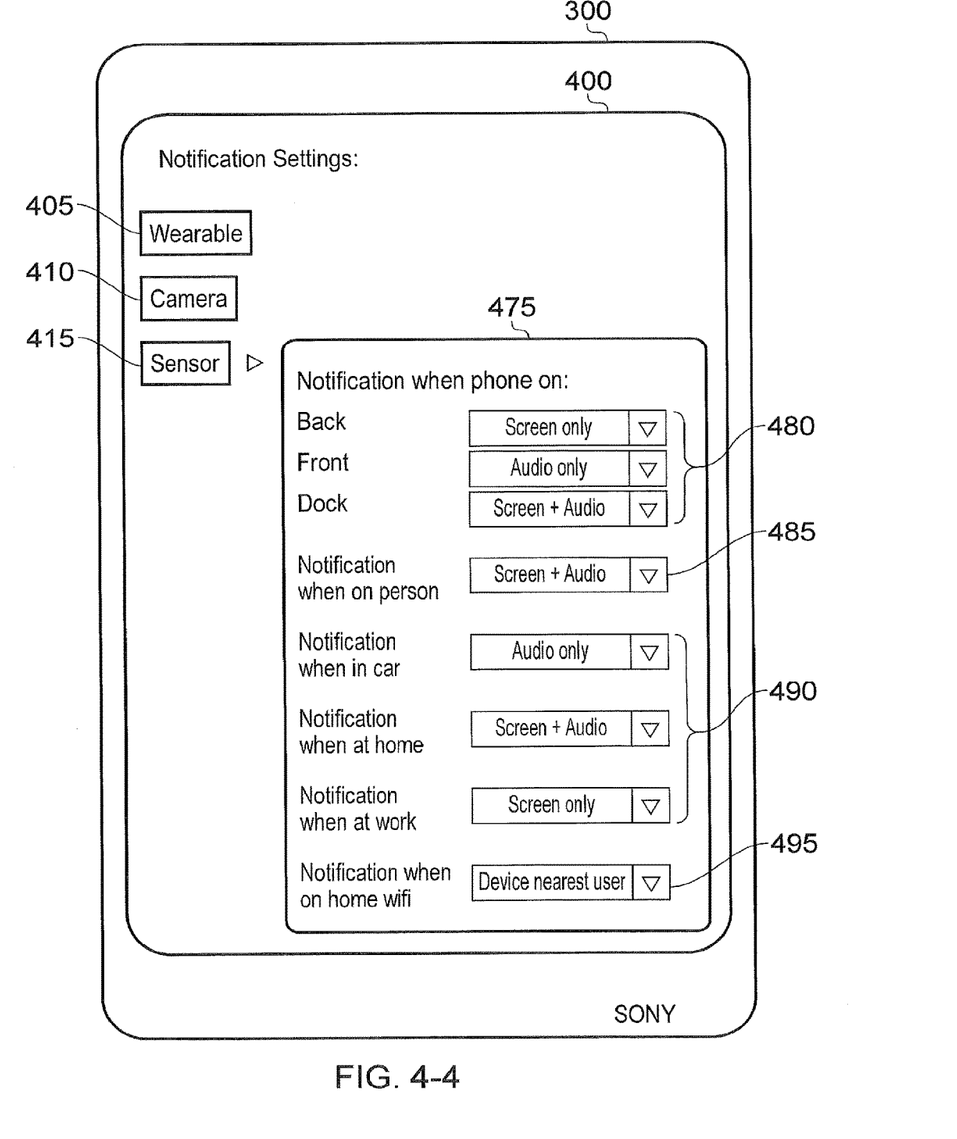

Referring to FIGS. 4-1 and 4-4, various setup screens and functionality of the information processing apparatus will be discussed.

In operation, the user of the information processing apparatus 300 will need to configure the notification settings. If the user does not configure the settings, the information processing apparatus 300 will operate using default notifications set by the manufacturer, or operator or telephonic carrier. The set-up of the notification settings is achieved by the user accessing the notification settings window 400. This is, in embodiments, a software application (an "app") running on the information processing apparatus 300.

When the notification settings window 400 is opened, three icons are displayed. The first icon is a wearable device icon 405. The second icon is a camera icon 410. Finally, the third icon is sensor icon 415. The purpose of these icons is to configure the information processing apparatus 300 to notify the user of notifications received in certain situations. The term notification in the context of this application means any kind of message received for the user. For example, a text message, a voice call, video conference, Email, diary reminder, app notification or any kind of message which must be brought to the attention of the user. Indeed, the term notification is not limited to only notifications over a network. Internal notifications such as calendar reminders, notes or other reminders generated internally within the information processing apparatus are also envisaged.

Figure 42:
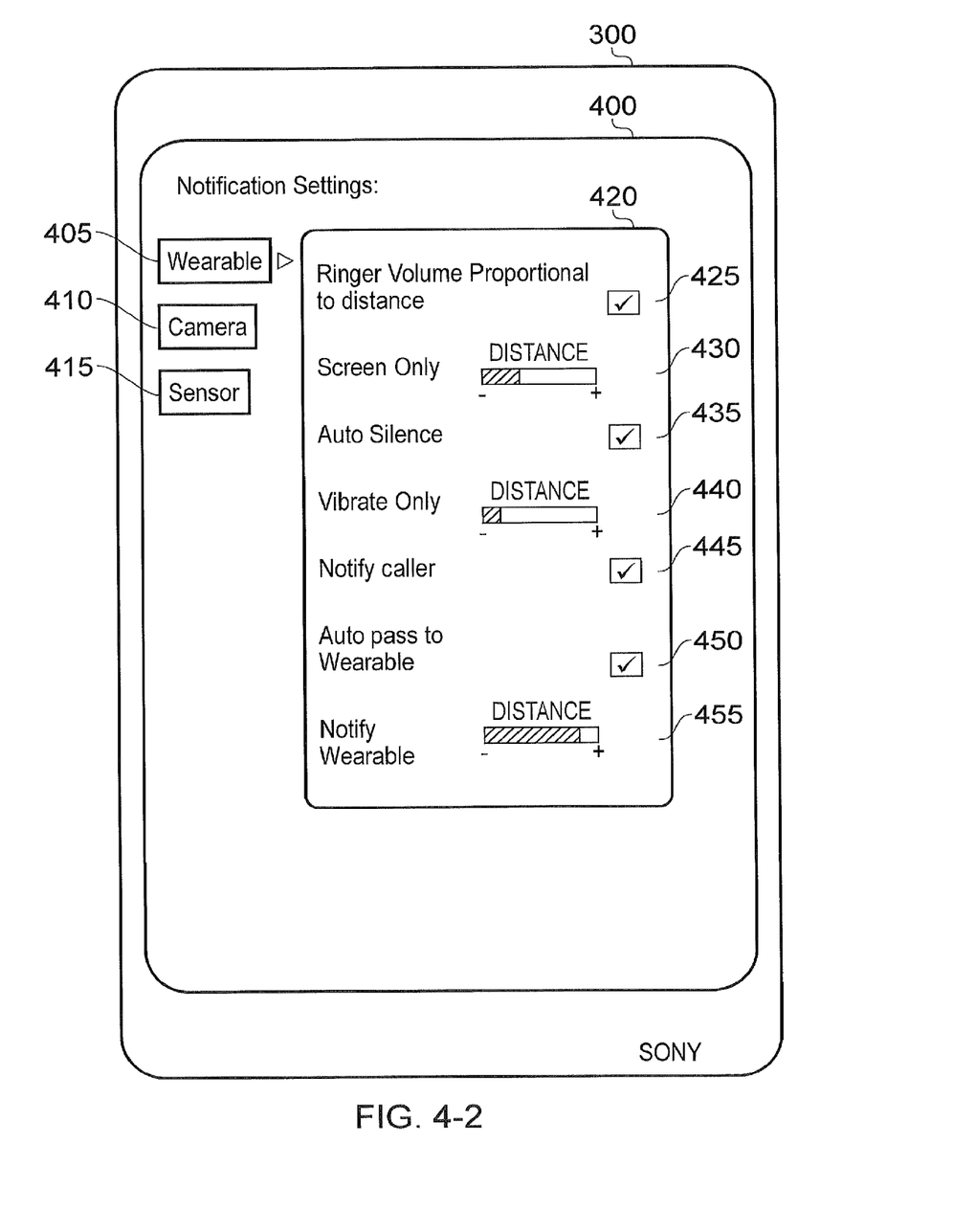

Referring to FIG. 4-2, when a user selects the wearable device icon 405 using either a touch screen, keyboard, mouse or the like, a wearable icon menu 420 is opened. This menu provides the user with the option with selecting various functionality which will be applied to notifications for a user when the second device 200 is located close to the user, such as when the second device 200 is a wearable device.

The first menu item in the wearable icon menu 420 allows the user to set the ringer volume 425. In particular, the user is provided with the option of setting the ringer volume to be proportional to the distance between the second device 200 and the information processing apparatus 300. The mechanism for determining the distance between the information processing apparatus 300 and the second device will be described later. However, by setting the ringer volume to be proportional to the distance between the second device and the information processing apparatus, if the second device 200 is a piece of wearable technology, the ringer volume will be proportional to the distance between the user and the information processing apparatus 300. This means that the closer the user is to the information processing apparatus, the lower the ringer volume produced by the speaker when a notification to the user is required. This reduces annoyance to other people in the vicinity of the information processing apparatus 300 and also reduces battery consumption as the speaker does not need to operate on such a loud volume.

Additionally, it is envisaged that the notification mechanism will change depending on the relative distance between the user and the information processing apparatus 300. For example, this may include the notification being an audible alert when the user is further than a predetermined distance away from the information processing apparatus 300 and when the user moves to the predetermined distance, the notification will become a visual only notification. Additionally, the notification may change during movement of the user. For example, when the user is greater than a predetermined distance from the information processing apparatus 300, a loud notification of rapid alerts may be activated. However, as the user moves towards the information processing apparatus 300, the rate of those rapid alerts will slow. In other words, as the user becomes closer to the information processing apparatus 300, the time between each alert increases. This is useful because if the user is moving towards the information processing apparatus 300, the user is more likely to appreciate that a notification is present and so the information processing apparatus 300 does not need to notify the user as urgently.

Of course, although the specific example has the ringer volume be proportional to distance, this need not be the case. The ringer volume may in fact be proportional to the distance squared. This is because the volume decreases proportionally to the distance squared. Therefore, by providing this relationship, the ringer volume may be more appropriately changed.

When the user is very close to the information processing apparatus 300, there is sometimes no need to engage the speaker at all. In this case, the notification message may be only to the screen. The distance between the user and the information processing apparatus 300 may be set using the screen only slide bar 430. In other words, the user sets the distance when the notification is provided only to the screen using the slide bar. The closer the slide bar is to the negative symbol, the smaller the distance between the second device 200 and the information processing apparatus 300 when only the screen is used to communicate a notification to the user.

An auto silence button 435 is also provided. The user can select the auto silence button 435 so that if the distance between the second device 200 and the information processing device 300 is greater than a predetermined distance then any audible notification is silenced. This allows for the situation where the user leaves the information processing apparatus 300 on a desk or the like and walks away from the information processing apparatus 300. In this case, other users in the vicinity of the information processing apparatus will not be disturbed.

Additionally, a vibrate only feature is provided with the vibrate only function 440. This provides the option for a user to select the distance between the information processing apparatus 300 and the second device 200 by which all notifications to the user will be via vibration only. Again, this reduces the impact of the notification on other people located near the information processing apparatus. The vibrate only function 440 is useful where there is little distance between the second device 200 and the information processing apparatus 300 because the user will only be notified via vibration which will they will feel or hear. It is envisaged that different notifications will have different vibration patterns. For example, a telephone call may have several short bursts of vibrations whereas a text message may have a single pulse of vibration and an email may have two single pulses in rapid succession. Of course, the disclosure is not so limited to any one particular example.

Additionally, there is provided a notify caller feature 445 which may be selected by the user. With this particular feature, the caller to the information processing apparatus 300 will be notified if the second device 200 is a predetermined distance or greater away from the information processing apparatus 300. In other words, if the user is located at a distance far from the information processing apparatus 300, then the caller will be notified of this and can select to either continue their call or hang up on the basis of this. Indeed, this idea may be extended so that the caller is notified if the distance between the information processing apparatus 300 and the second device 200 is either increasing indicating that the user is walking away from the information processing apparatus or is decreasing indicating that the user is walking towards the information processing apparatus 300. Moreover, the speed at which the user is moving toward the information processing apparatus 300 may also be communicated to the caller in this instance because they may wish to hold on if the user is running towards the information processing apparatus 300.

An auto pass to wearable feature 450 may be selected. In this feature, if the distance between the second device 200 and the information processing apparatus 300 is greater than a threshold, such that the user would not be able to reach the information processing apparatus 300, the notification will automatically be passed to the wearable device and the information processing apparatus 300 would act as an intermediary between the second device 200 and the network. In other words, the user will interact with the second device 200 and those interactions which, may be a voice call or a text message, would be passed onto the network by the transceiver circuitry in the information processing apparatus 300.

In order to achieve this hand-over, the information processing apparatus 300 transmits a signal to the second device 200 via its transceiver circuitry. This signal requests that the communication is handed over to the second device 200. If the second device 200 has the capability to receive the notification, and to allow communication, for example, has a microphone if the notification is a telephone call, the second device 200 sends an acknowledgement to the information processing apparatus 300. Upon receipt of the acknowledgement, the information processing apparatus 300 then hands off the communication to the second device 200 and commences acting as an intermediary between the second device 200 and the network.

Finally, a notify wearable function 445 is provided. With this function, the distance between the information processing apparatus 300 and the second device 200 is set such that if the distance is greater than the threshold, the second device 200 would be notified of the incoming message by either vibrating or an audible indication or the like. This ensures that if there is significant distance between the second device 200 and the information processing apparatus 300 that the user will be notified of an incoming message and may take appropriate action.

It is envisaged that numerous mechanisms may be provided to determine the distance between the second device 200 and the information processing apparatus 300. For example, the signal strength of a polling signal sent between the transceiver of the second device 200 and the transceiver of the information processing apparatus 300 may be measured. The signal strength would provide an indication as to the distance between the two devices in a known manner. Alternatively, or additionally, a polling signal may be sent between the two devices and the timing difference between these signals may indicate the relative distance between the two devices. Both of these techniques are known in the Art and will not be described in any detail.

Figure 43:
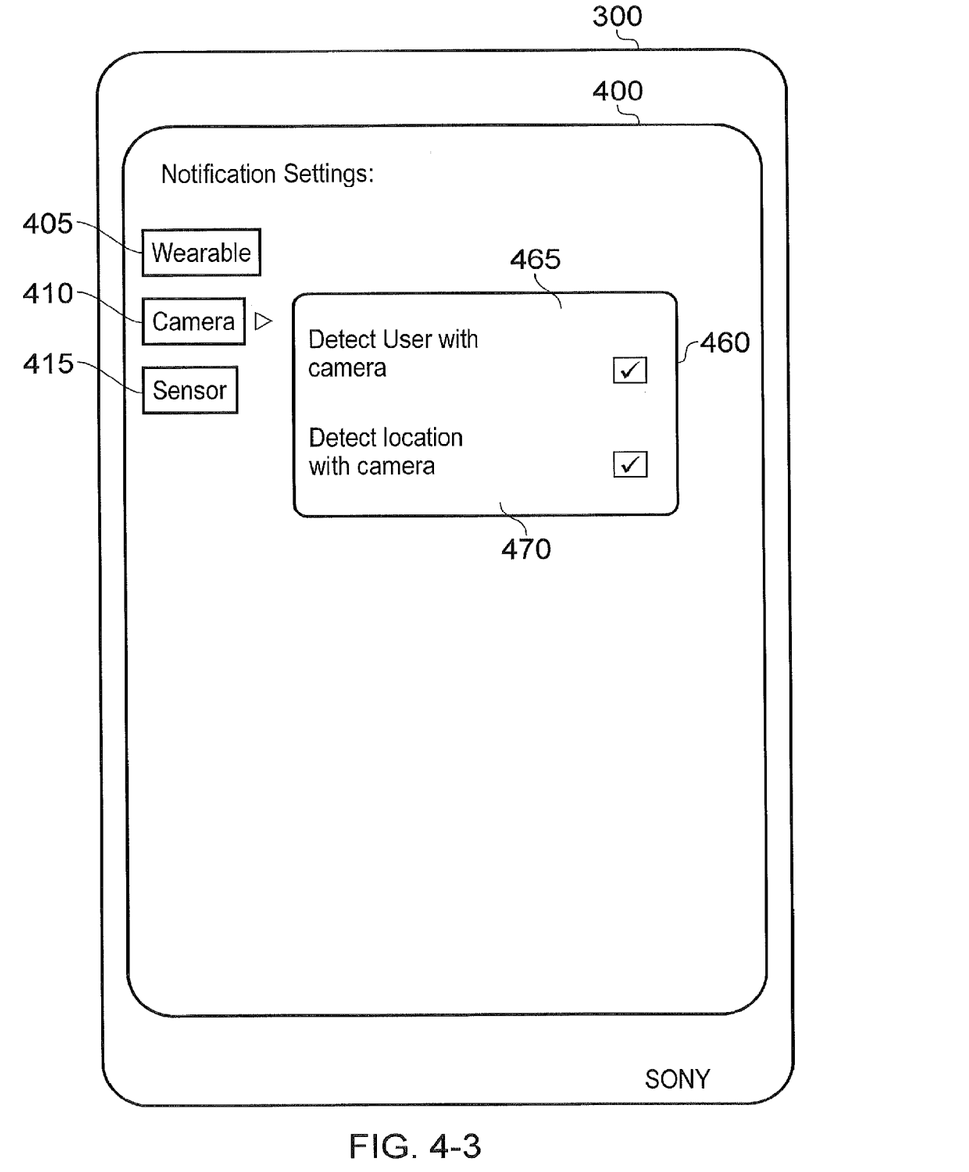

Referring now to FIG. 4-3, the notification settings window 400 is shown with the camera icon selected. In response, to the user selecting the camera icon 410, a camera icon menu 460 is displayed. In the camera icon menu 460, an option is provided which allows the information processing apparatus 300 to detect the user with the camera. The user may select this feature and in doing so, when the information processing apparatus 300 is stationary as sensed by the information processing apparatus sensor circuitry 330, the camera is activated and image recognition takes place. Specifically, the image recognition software within the information processing apparatus 300 compares the detected image with one or more reference images stored within storage 315. In embodiments, the captured image may be compared with an image of the user and the user's face may be detected from the captured image. This image recognition process is known in the Art and so will not be described for brevity. Additionally, the image processing apparatus 300 can optionally use the camera settings to determine the distance from the camera of the user. Again, this technique is known and uses camera settings such as the focal length and the zoom of the camera in order to detect the distance between the user and the camera of the image processing apparatus 300.

Using similar techniques, the image processing apparatus 300 may detect the location using the camera as provided in feature 470 of the camera icon menu.

The function of the camera icon menu is to provide, to the user, two functions for which the position of the user and the distance from the user of the information processing apparatus 300 as well as the location of the information processing apparatus 300 is used. Using this information, various functionality within the information processing apparatus may be activated.

Specifically, if the user is less than a predetermined distance from the information processing apparatus 300, the information processing apparatus control circuitry 305 will reduce the volume of the speaker. This ensures that the information processing apparatus 300 consumes less power then if a speaker was not reduced in volume and so also reduces the annoyance of the information processing apparatus 300 with respect to the surroundings. In embodiments, the volume of the speaker is proportional to the distance between the user and the information processing apparatus 300. Moreover, the information processing apparatus 300, and specifically the information processing apparatus control circuitry 305 may be configured to control the display 320 to perform the notification mechanism only on the screen when the distance between the user and the information processing apparatus is below a certain threshold.

In other words, the camera may be used to determine the distance between the user and the information processing apparatus and the functionality associated with the wearable device icon as explained with reference to FIG. 4-2 provided.

Further, if the determined location is a particular location, such as the work place, the notification may only be provided using the screen and the volume of the speaker muted.

Referring to FIG. 4-4, a notification settings window 400 is shown when the sensor icon 415 is pressed. When the sensor icon 415 is pressed, the sensor icon menu 475 is provided. The sensor icon menu provides certain functionality when specific sensors within the information processing apparatus sensor circuitry 330 have certain settings. As noted above, the sensors within the information processing apparatus sensor circuitry 330, may include a gyroscope, accelerometer, GPS circuitry or even detecting the presence of the information processing apparatus 300 on a home network.

Turning to the sensor icon menu 475, the user can select what notifications are provided to the user when the phone is located on its rear surface, front surface or located in a dock. This is shown with dropdown menus 480. In embodiments, when the phone is located on its rear surface so that the screen is visible, the user may select that any notification is provided on the screen only. This is because the speaker, which tends to be located on the rear of the information processing apparatus 300, will be obscured and the screen will be displayed. Similarly, if the information processing apparatus 300 is located on its front surface (that is on its screen) then the notification will come in via audio only. This is because the user will not be able to see the screen on the display and so battery will be saved. Finally, if the information processing apparatus 300 is located in a dock, the notifications may come in via screen and audio. This is because both the speaker and the screen are visible and audible to the user. Also, as the dock usually charges the information processing apparatus 300, saving battery power is less important so having both the screen and speaker activated is not so important.

In the event that the sensor circuitry 330 detects that the information processing apparatus 300 is located on the user (i.e. the user is carrying the information processing apparatus 300), the settings 485 are shown such that the notification comes in via screen and audio. This gives the user the maximum opportunity to identify that a notification has arrived.

Further, when the information processing apparatus 300 detects it is located in a car or moving, via the GPS circuitry indicating that the information processing apparatus 300 is moving, then the notifications may only come in via audio only. This is because the user does not want to be distracted by a screen whilst driving or moving. Further, when the user is located at home, in order to give the user maximum opportunity to be notified of an incoming message, the screen and audio are activated when an incoming message is received. Further, when the user is located at work, in order to reduce the disturbance to colleagues and to the user, the notification will only be provided via screen only. Of course, all of these settings may be changed in accordance with user preferences.

When located at home, and specifically on a home network, if a device can indicate the presence of a user in its vicinity, using a camera located in a device, then the notification may be provided to the device nearest the user. This is set in menu item 495.

Figure 5:
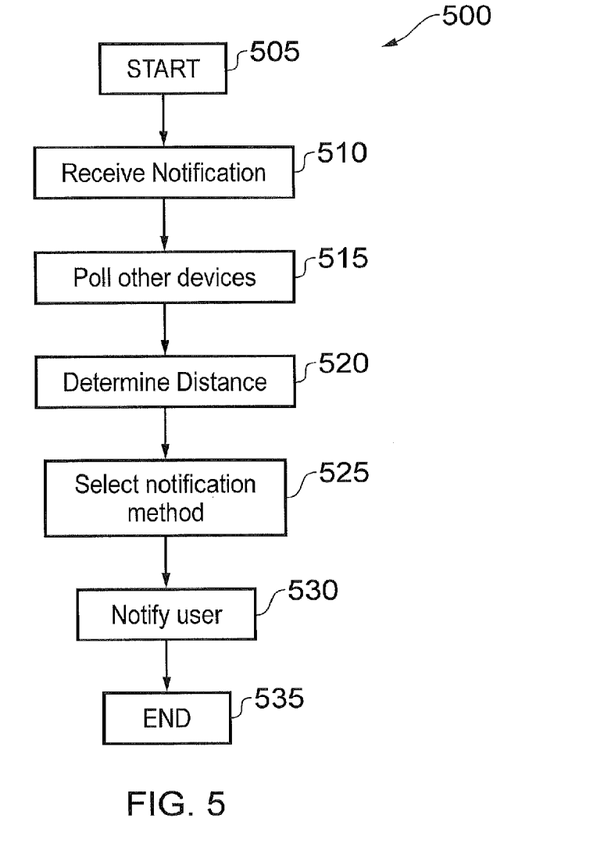
FIG. 5 shows a flowchart explaining a first use case.

Referring to FIG. 5, a flowchart explaining the embodiments of FIG. 4-2 of the disclosure is shown. The process 500 starts at start 505. The information processing apparatus 300 then receives a notification in step 510. The notification may be a text message or a phone call or an email of the like. In response to receiving the notification, the information processing apparatus 300 sends a polling signal to the other devices connected to the information processing apparatus 300. Specifically, the second device 200 will be paired with the information processing apparatus 300. Upon receipt of the notification from the network, the information processing apparatus 300 will then poll the second device 200. Of course, if the information processing apparatus 300 is regularly polling the second device 200 then no further polling may be required.

In response to this polling, the second device 200 will send a response back the information processing apparatus 300. From this response, the information processing apparatus control circuitry 305 will determine the distance of the second device 200. This can be achieved by measuring the signal strength of the received response from the second device. This is a known technique and will not be explained in any further detail.

Depending upon the distance between the information processing apparatus and the second device 200, an appropriate notification method will be selected by the information processing apparatus control circuitry 305 in step 525. In particular, the information processing apparatus control circuitry 305 will interrogate the information processing apparatus storage 315 to establish the appropriate notification method set by the user in response to the determined distance. So as will be understood, the appropriate notification method may change as the determined distance changes.

The user will be then notified using the appropriate method in step 530. After notification, the process ends in step 535.

Figure 6:
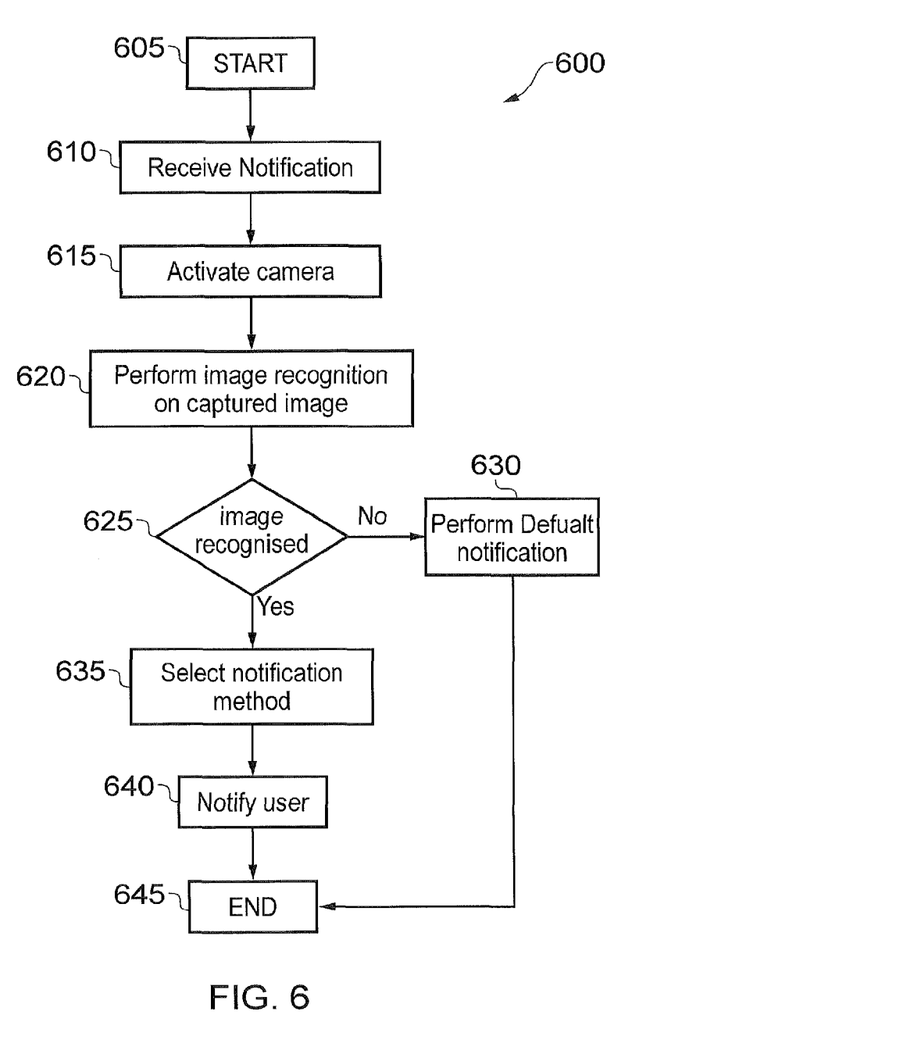
FIG. 6 shows a flowchart explaining a second use case.

Referring to FIG. 6, embodiments of the present disclosure noted in FIG. 4-3 are explained in flowchart 600.

The process 600 starts at step 605. Similarly to FIG. 5, a notification is received at the information processing apparatus 300 from the network. This is step 610. In response to this notification, the camera or cameras are activated within the information processing apparatus 300. This is step 615. It is advantageous to activate the camera in response to the notification because the information processing apparatus 300 may stay in standby until a notification is received. This saves power.

The camera or cameras capture an image. The information processing apparatus control circuitry 305 then performs image recognition on the captured image in step 620. The purpose of the image recognition is to identify the user of the information processing apparatus 300 and determine the distance of the user from the information processing apparatus. Additionally or alternatively, the image recognition may be used to determine the location of the information processing apparatus 300. For example, the user may leave the information processing apparatus on a specific part of their desk at the office and the camera can be trained to identify this location within the office. Image recognition of this type is well known in the art and so will not be explained in detail here. This is step 620.

The information processing apparatus control circuitry 305 then determines whether the image is recognised in step 625. If the image is not recognised, the no path is followed. In other words, if the information processing apparatus control circuitry 305 does not recognise either a user or a location of the information processing apparatus 300 then the no path is followed. In this case, default notification (such as a factory set notification) is performed in step 630. For example, a text message will make a default beep and a user's ringer volume will be set to be a normal ringtone. The process then ends in step 645. Returning to step 625, if the image is recognised, the yes path is followed. In step 635, the information processing apparatus control circuitry 305 selects the notification method as determined and set by the user as explained with reference to FIGS. 4-2. This occurs in step 635. The user is accordingly notified in step 640 and the process ends in step 645.

Figure 7:
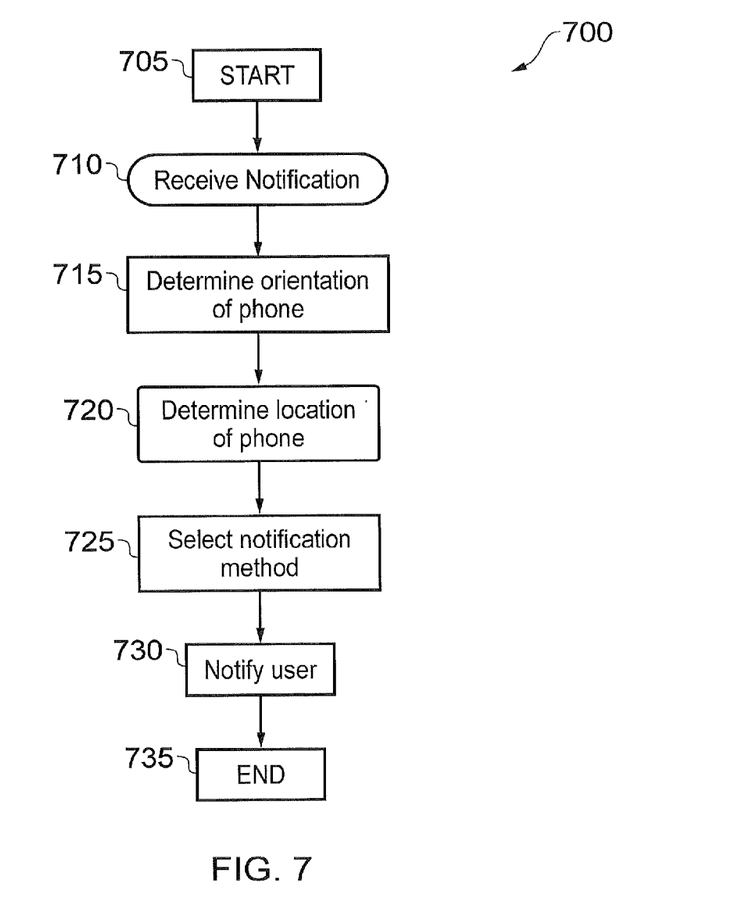
FIG. 7 shows a flowchart explaining a third use case.

Referring to FIG. 7, a flowchart 700 showing a notification method according to embodiments of the disclosure explained in FIG. 4-4 is shown. The process 700 starts in step 705. As in reference to FIGS. 5 and 6, a notification is received from the wireless network in step 710. The information processing apparatus 300 activates this information processing apparatus sensor circuitry 330 and uses the information processing apparatus sensor circuitry such as the gyroscopes and accelerometer to determine the orientation of the phone in step 715. This is a known technique. From this, it is possible to determine the orientation and/or location of the phone in step 720. For example, the accelerometers and gyroscopes can be used to determine whether the phone is on its front or back case or its geographical position with reference to GPS sensors. On the basis of the location of orientation, the appropriate notification method as defined by the user with reference to FIG. 4-5 can be selected in step 725. Specifically, the information processing apparatus control circuitry 305 will integrate the information processing apparatus storage 315 and retrieve the appropriate notification method stored for the appropriate determined location and/or orientation. The information processing apparatus control circuitry 305 will then notify the user appropriately in step 730 and the process ends in step 735.

Although the use of the system described relates to portable devices, the disclosure is not so limited. In fact, the information processing apparatus 300 may be less portable such as a television or set-top box. In this embodiment, the television may receive notifications from the user's online presence such as Skype messages. These notifications then may allow the user to transfer a Skype call to a wearable device if the user moves from their current location. Further, the notification in this case may be a notification from an Electronic Program Guide (EPG). In other words, the notification may be from a program which has been noted to be of interest to the user. The notification may switch on the information processing apparatus 300 when it is received. Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the disclosure may be described generally by the following numbered paragraphs.

1. An information processing apparatus comprising:
   transceiver circuitry configured to receive a notification for a user;
   sensing circuitry configured to determine the position of the information processing apparatus;
   storage configured to store a notification mechanism in association with particular positions of the information processing apparatus; and
   control circuitry configured to control notification circuitry to perform the notification mechanism based on the position of the information processing apparatus.

2. An information processing apparatus according to paragraph 1, comprising a receiver configured to receive, from a device, a position signal, the position signal being used by the sensing circuitry to determine the position of the information processing apparatus.

3. An information processing apparatus according to paragraph 1, wherein the sensing circuitry is configured to receive a captured image; and the control circuitry is further configured to perform image recognition on the captured image to determine the position of the information processing apparatus.

4. An information processing apparatus according to paragraph 1, wherein the sensing circuitry is configured to detect the orientation of the information processing apparatus, and the control circuitry is configured to control the notification mechanism based on the orientation of the information processing apparatus.

5. An information processing apparatus according to paragraph 1, wherein the position of the information processing apparatus is determined to be a position relative to the user of the information processing apparatus.

6. An information processing apparatus according to paragraph 5, wherein the control circuitry is configured to control a speaker to perform the notification mechanism, whereby the volume of the speaker is proportional to the relative distance between the user and the information processing apparatus.

7. An information processing apparatus according to paragraph 5, wherein the control circuitry is configured to control a display to perform the notification mechanism only on a screen when the relative distance between the user and the information processing apparatus is below a threshold.

8. An information processing apparatus according to paragraph 5, wherein the control circuitry is configured to control the transceiver circuitry to generate a notification signal to send to a second device when the relative distance between the user and the information processing apparatus is above a threshold, the notification signal indicating to the second device the receipt of a notification at the information processing apparatus.

9. An information processing apparatus according to paragraph 8, wherein the transceiver circuitry is configured to receive, from the second device, a transfer signal and in response to the receipt of the transfer signal, the transceiver circuitry is configured to be an intermediary between the second device and the wireless network.

10. An information processing apparatus according to any preceding paragraph, wherein the transceiver circuitry is configured to receive the notification over a wireless network.

11. An information processing apparatus according to any one of paragraphs 5 to 10, wherein the control circuitry is configured to change the notification mechanism in the event that the relative distance between the user and the information processing apparatus is greater than a threshold distance.

12. An information processing method for an information processing apparatus, the method comprising:
   receiving a notification for a user;
   determining the position of the information processing apparatus;
   storing a notification mechanism in association with particular positions of the information processing apparatus; and
   performing the notification mechanism based on the position of the information processing apparatus.

13. An information processing method according to paragraph 12, comprising receiving, from a device, a position signal, the position signal being used to determine the position of the information processing apparatus.

14. An information processing method according to paragraph 12, comprising receiving a captured image; and performing image recognition on the captured image to determine the position of the information processing apparatus.

15. An information processing method according to paragraph 12, comprising detecting the orientation of the information processing apparatus, and controlling the notification mechanism based on the orientation of the information processing apparatus.

16. An information processing method according to paragraph 12, wherein the position of the information processing apparatus is determined to be a position relative to the user of the information processing apparatus.

17. An information processing method according to paragraph 16, comprising controlling a speaker to perform the notification mechanism, whereby the volume of the speaker is proportional to the relative distance between the user and the information processing apparatus.

18. An information processing method according to paragraph 16, comprising controlling a display to perform the notification mechanism only on a screen when the relative distance between the user and the information processing apparatus is below a threshold.

19. An information processing method according to paragraph 16, comprising generating a notification signal to send to a second device when the relative distance between the user and the information processing apparatus is above a threshold, the notification signal indicating to the second device the receipt of a notification at the information processing apparatus.

20. An information processing method according to paragraph 19, comprising receiving, from the second device, a transfer signal and in response to the receipt of the transfer signal, the information processing apparatus is configured to be an intermediary between the second device and the wireless network.

21. An information processing method according to any one of paragraphs 12 to 20, comprising receiving the notification over a wireless network.

22. An information processing method according to paragraph 16, comprising changing the notification mechanism in the event that the relative distance between the user and the information processing apparatus is greater than a threshold distance.

23. A computer program comprising computer readable instructions, which, when loaded onto a computer configures the computer to perform the method of any one of paragraph 12 to 22.

24. A computer program product configured to store the computer program of paragraph 23 therein or thereon.

25. An information processing apparatus, method or computer program as substantially hereinbefore described with reference to the accompanying drawings.

The invention claimed is:

1. An information processing apparatus comprising:
transceiver circuitry configured to receive a notification for a user of the information processing apparatus;
sensing circuitry configured to determine a position of the information processing apparatus relative to the user;
storage configured to store a plurality of notification mechanisms in association with particular positions of the information processing apparatus, wherein each of the plurality of notification mechanisms is configured to notify the user via a different sensory medium; and
control circuitry configured to:
select one of the plurality of notification mechanisms based on the position of the information processing apparatus,
control notification circuitry to perform the selected notification mechanism based on the position of the information processing apparatus,
select a different one of the plurality of notification mechanisms when a relative distance between the user and the information processing apparatus is greater than a threshold distance, and
control the transceiver circuitry to generate a notification signal to send to a second device when the relative distance between the user and the information processing apparatus is greater than the threshold distance, the notification signal indicating to the second device a receipt of the notification at the information processing apparatus by controlling the second device to perform one of the plurality of notification mechanisms so as to notify the user,
wherein at least a rate of the one of the plurality of notification mechanisms performed by the second device varies in real time based on a movement of the user with respect to the information processing apparatus.

2. The information processing apparatus according to claim 1, wherein the control circuitry is further configured to control a speaker to perform an audio notification mechanism of the plurality of notification mechanisms, whereby the volume of the speaker is proportional to the relative distance between the user and the information processing apparatus.

3. The information processing apparatus according to claim 1, wherein the control circuitry is further configured to control a display to perform only a visual notification mechanism of the plurality of notification mechanisms on a screen when the relative distance between the user and the information processing apparatus is less than the threshold distance.

4. The information processing apparatus according to claim 1, wherein the transceiver circuitry is further configured to receive a transfer signal from the second device, and in response to the receipt of the transfer signal, the transceiver circuitry is configured to be an intermediary between the second device and a wireless network.

5. The information processing apparatus according to claim 1, wherein the transceiver circuitry is further configured to receive the notification over a wireless network.

6. An information processing method for an information processing apparatus, the method comprising:
receiving a notification for a user of the information processing apparatus;
determining a position of the information processing apparatus relative to the user;
storing a plurality of notification mechanisms in association with particular positions of the information processing apparatus, wherein each of the plurality of notification mechanisms is configured to notify the user via a different sensory medium;
selecting one of the plurality of notification mechanisms based on the position of the information processing apparatus;
performing the selected notification mechanism based on the position of the information processing apparatus;
selecting a different one of the plurality of notification mechanisms when a relative distance between the user and the information processing apparatus is greater than a threshold distance; and
generating a notification signal to send to a second device when the relative distance between the user and the information processing apparatus is greater than the threshold distance, the notification signal indicating to the second device a receipt of the notification at the information processing apparatus by controlling the second device to perform one of the plurality of notification mechanisms so as to notify the user, wherein at least a rate of the one of the plurality of notification mechanisms performed by the second device varies in real time based on a movement of the user with respect to the information processing apparatus.

7. The information processing method according to claim 6, further comprising controlling a speaker to perform an audio notification mechanism of the plurality of notification mechanisms, whereby the volume of the speaker is proportional to the relative distance between the user and the information processing apparatus.

8. The information processing method according to claim 6, further comprising controlling a display to perform only a visual notification mechanism of the plurality of notification mechanisms on a screen when the relative distance between the user and the information processing apparatus is less than the threshold distance.

9. The information processing method according to claim 6, further comprising receiving a transfer signal from the second device, and in response to the receipt of the transfer signal, the information processing apparatus is configured to be an intermediary between the second device and a wireless network.

10. The information processing method according to claim 6, further comprising receiving the notification over a wireless network.

11. A non-transitory computer-readable medium storing instructions that, when executed by one or more processors of an information processing apparatus, cause the information processing apparatus to:
receive a notification for a user of the information processing apparatus;
determine a position of the information processing apparatus relative to the user;
store a plurality of notification mechanisms in association with particular positions of the information processing apparatus, wherein each of the plurality of notification mechanisms is configured to notify the user via a different sensory medium;
select one of the plurality of notification mechanisms based on the position of the information processing apparatus;
perform the selected notification mechanism based on the position of the information processing apparatus;
select a different one of the plurality of notification mechanisms when a relative distance between the user and the information processing apparatus is greater than a threshold distance; and
generate a notification signal to send to a second device when the relative distance between the user and the information processing apparatus is greater than the threshold distance, the notification signal indicating to the second device a receipt of the notification at the information processing apparatus by controlling the second device to perform one of the plurality of notification mechanisms so as to notify the user,
wherein at least a rate of the one of the plurality of notification mechanisms performed by the second device varies in real time based on a movement of the user with respect to the information processing apparatus.

12. The information processing apparatus according to claim 1, wherein the notification signal controls the second device to vibrate or generate an audible indication.

13. The information processing apparatus according to claim 1, wherein the control circuitry is further configured to control the transceiver circuitry to transmit a polling signal to the second device, derive a timing difference based on the polling signal, and determine the relative distance between the information processing apparatus and the second device based on the timing difference.

* * * * *